United States Patent [19]

Ohshita et al.

[11] Patent Number: 4,823,740

[45] Date of Patent: Apr. 25, 1989

[54] THERMAL REACTOR

[75] Inventors: Takahiro Ohshita; Tsutomu Higo, both of Kanagawa; Shigeru Kosugi; Naoki Inumaru, both of Tokyo; Hajime Kawaguchi, Kanagawa, all of Japan

[73] Assignee: Ebara Corporation, Tokyo, Japan

[21] Appl. No.: 224,273

[22] Filed: Jul. 26, 1988

Related U.S. Application Data

[63] Continuation of Ser. No. 6,066, Jan. 21, 1987, abandoned.

[30] Foreign Application Priority Data

| Jan. 21, 1986 | [JP] | Japan | 61-8880 |
| Mar. 12, 1986 | [JP] | Japan | 61-52559 |
| Jul. 3, 1986 | [JP] | Japan | 61-155059 |
| Aug. 13, 1986 | [JP] | Japan | 61-188589 |
| Sep. 5, 1986 | [JP] | Japan | 61-207702 |
| Sep. 12, 1986 | [JP] | Japan | 61-214028 |

[51] Int. Cl.$^4$ .............................. B09B 3/00
[52] U.S. Cl. ........................... 122/4 D; 110/245; 165/104.16
[58] Field of Search .............. 122/4 D, DIG. 13; 431/7, 17 D; 110/245; 165/104.16; 34/57 A

[56] References Cited

U.S. PATENT DOCUMENTS

| 3,702,595 | 11/1972 | Muirhead et al. | 122/4 D |
| 3,881,857 | 5/1975 | Hoy et al. | 431/7 |
| 3,921,590 | 11/1975 | Mitchell et al. | |
| 3,970,011 | 7/1976 | Virr et al. | |
| 4,279,222 | 7/1981 | Pearce | 122/4 D |
| 4,301,771 | 11/1981 | Jukkola et al. | 122/4 D |
| 4,363,292 | 12/1982 | Engström | |
| 4,419,330 | 12/1983 | Ishihara et al. | |
| 4,457,289 | 7/1984 | Korenberg | |
| 4,528,945 | 7/1985 | Virr et al. | |
| 4,619,314 | 10/1986 | Shimoda | 122/DIG. 13 |

FOREIGN PATENT DOCUMENTS

| 55-118515 | 3/1979 | Japan. |
| 55-165416 | 12/1980 | Japan. |
| 57-127716 | 1/1981 | Japan. |
| 1522601 | 8/1978 | United Kingdom. |
| 1577717 | 10/1980 | United Kingdom. |

OTHER PUBLICATIONS

"Fluidization Engineering", Daizo Kunii, John Wiley and Sons, Inc., Wiley International Edition, pp. 272–277.

"A Novel In-Bed Heat Transfer Tube Capable of Decreasing $h_w$ Linearly With Load Turndown", by Masayuki Horio et al., pp. 655, 663.

"Bed To Surface Heat Transfer In A Fluidized Bed Of Large Particules" Denloye et al., pp. 197–203.

"The Control Of Industrial Fluidized Bed Boiler Plant", Michael J. Virr, Johnston Boiler Company, pp. 350–359.

Primary Examiner—Edward G. Favors
Attorney, Agent, or Firm—Wenderoth, Lind & Ponack

[57] ABSTRACT

A thermal reactor of fluidizing bed type includes a thermal recovering arrangement. A part of a fluidizing medium is supplied into the thermal energy recovering arrangement so as to pass therethrough, whereby; thermal energy is recovered by a heat exchanger disposed in the recovering arrangement.

9 Claims, 16 Drawing Sheets

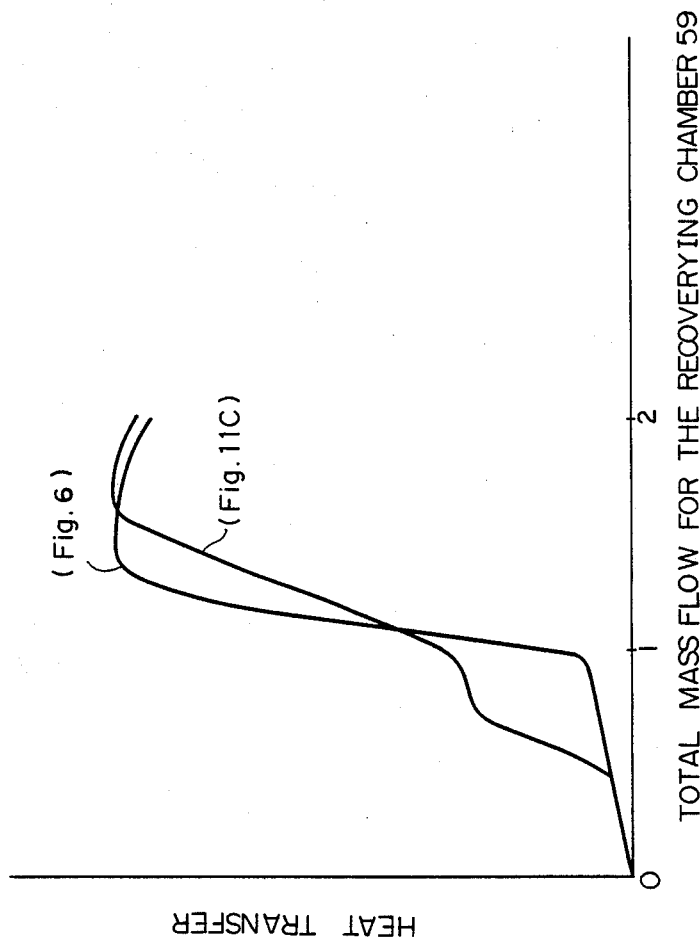

THERMAL REACTOR

This application is a continuation of now abandoned application Ser. No. 07/006,066 filed Jan. 21, 1982.

BACKGROUND OF THE INVENTION

The present invention relates to a thermal reactor and more particularly to an improvement for recovering thermal energy in a thermal reactor of the fluidizing bed reactor or incinerator type.

DESCRIPTION OF THE PRIOR ART

Thermal reactors of the fluidizing bed type have become widely known as being suitable for the disposal of municipal waste or the like, as well as for burning several types of fuel such as coal, petroleum cakes, etc., such fuels exhibiting relatively low incineration rates.

Among the several versions of such reactors which have been developed, it is also known that one which incorporates a circulating fluidized bed is quite efficient for the operations referred to above. For example, a reactor of this type in which a fluidizing medium is subjected to circulation within a fluidizing chamber is disclosed in U.S. Pat. Nos. 4,419,330 and 4,452,155.

In such reactors a diffusion means is arranged to produce a difference in the amount of a fluidizing gas blown upwardly toward the medium, whereby the medium in one part above the diffusion means is subjected to stronger fluidization than another part. In this way the medium as a whole is caused to exhibit a circulating or whirling mode within the fluidizing chamber. In other words, in the fluidizing bed explained above, there will be a zone where fluidization is relatively strong and the medium tends to move upwardly, another zone where fluidization is relatively weak and the medium tends to descend relative to the other zone where fluidization is stronger and, at the upper and lower parts of these zones, the medium in the respective parts tends to move laterally to the other of the two zones. In this way circulation of the bed is effected in totality. This circulation is also performed by provision of a deflecting means provided between a free board and the fluidizing chamber of the reactor.

The reactor of the type referred to above exhibits superior effects. For example, a pre-shredding operation is made unnecessary in the case of disposing of municipal waste or the like, and even relatively light materials may be entrained within the fluidizing bed due to the presence of the descending zone, so that such light materials may be effectively burnt within the bed without merely being burnt on the surface of the bed. However, in cases where the volume of objects to be disposed of or incinerated, or the heating value derived from the same varies, the fluidizing medium may sometimes be over heated beyond a predetermined temperature limit, for example, 800° C. Should such over heating occur, the medium would then be sintered together due to the possible presence of alkali metals or the like, thereby generating clinkers or lumps or causing them to stick to parts of the reactor so that operation of the reactor deteriorates or reaches a stage where it has to be stopped. Accordingly, it has been the practice on such occasions to spray water on the medium in order to lower its temperature. Therefore, in this case, the thermal energy generated as simply lost without being profitably utilized. If an attempt is made to recover such thermal energy by disposing a heat exchanger such as one consisting of a plurality of tubes within which air or water is circulated, the fluidization will be hindered thereby and the tubes will be subjected to abrasion or easily corroded.

Some attempts have been made to recover such thermal energy such as disclosed in Japanese Patent Public Disclosure No. 183937/83 wherein an energy recovering chamber is disposed adjacent a main fluidizing chamber. This apparatus is utilized to feed a part of the fluidizing medium to the energy recovering chamber. However, the temperature of the portion of the medium fed towards the recovering chamber is not effectively raised because such portion of the fluidizing medium is not provided with lateral movement and, thus, is moved upwardly in the fluidizing chamber without mixing to any substantial extent with the medium in the high temperature zone of the fluidizing bed, and is then fed to the recovering chamber where its temperature is lowered. When such medium is returned to the main fluidizing bed, its temperature is not sufficiently raised due to the phenomenon described above.

Further, conventional fluidizing bed reactors have been controlled only by intermittent operations.

SUMMARY OF THE INVENTION

Accordingly it has been desired to have a reactor which does not encounter such drawbacks of the prior art as discussed above and, instead, to most effectively utilize the heat energy generated in the reactor.

It is an object of the present invention to provide a thermal reactor which is free from the drawbacks described above.

It is, therefore, a further object of the present invention to provide a thermal reactor in which overheating of the fluidizing medium is effectively prevented and in which the thermal energy is effectively recovered without generating clinkers.

The above objects are accomplished according to the present invention wherein a thermal energy recovering chamber or chambers are provided adjacent the main fluidizing chamber so that a part of the heated fluidizing medium is circulated through the chambers wherein the thermal energy is recovered by a heat exchanging means disposed in the thermal energy recovering chambers, with an auxiliary fluidizing means being associated with the thermal energy recovering chamber(s) to assist circulation of the medium through the chamber(s).

BRIEF DESCRIPTION OF THE DRAWINGS

FIG. 9 is an enlarged view of a staggered arrangement of the water tubes shown in FIG. 8a;

FIG. 13 is a graph showing the heat transfer which takes place in the arrangements shown in FIGS. 6 and 11C.

DETAILED DESCRIPTION OF THE INVENTION

Figure 1:
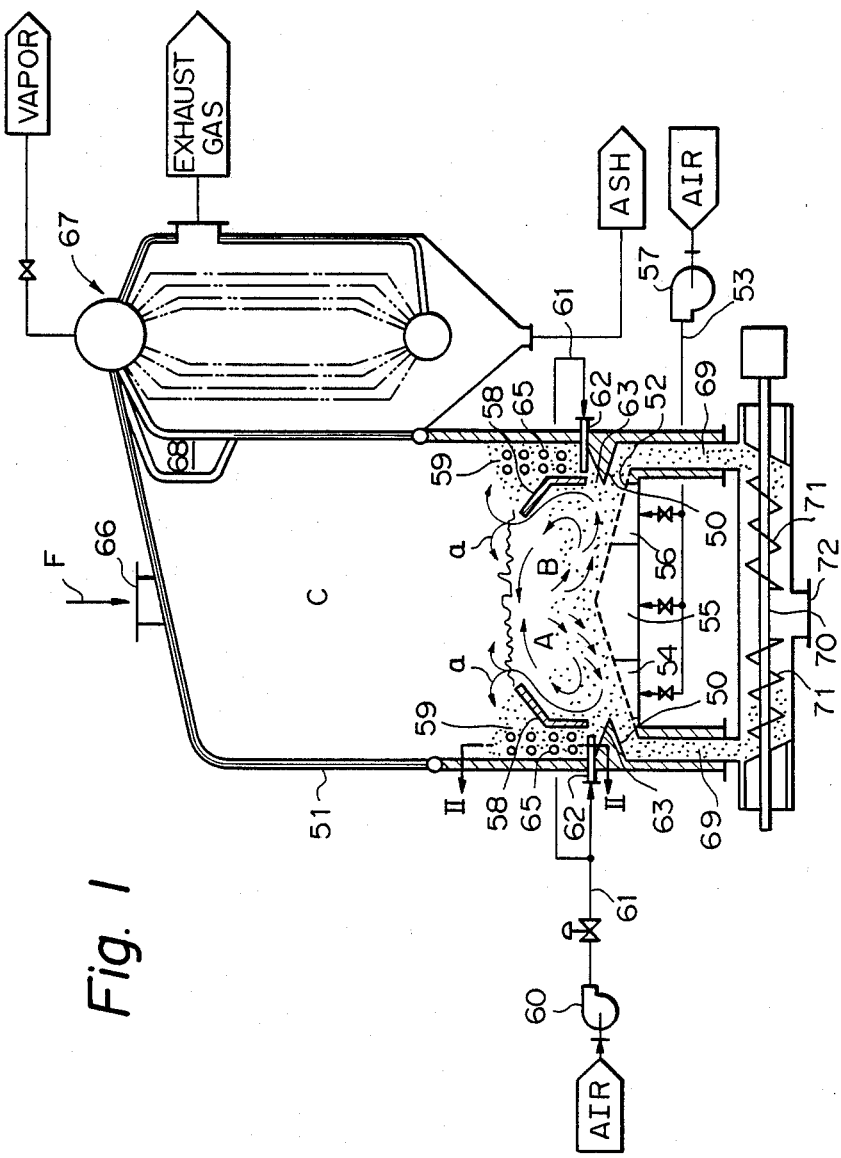
FIG. 1 is a schematic illustration of a thermal reactor according to the present invention.

Referring now to FIG. 1, there is schematically illustrated a thermal reactor 51 according to the present invention. This reactor 51 having a rectangular horizontal section is shown as being for use with a boiler 67. Within the reactor 51, a diffusor 52 is provided at the lower portion of the reactor and the diffusor 52 is coupled to a pressurized gas source such as a blower 57 through a conduit 53 so that a fluidizing gas may be blown upwardly from the diffusor 52 to fluidize a fluidizing medium above the diffusor 52 within a lower part of the reactor.

In order to produce a circulating fluidized bed retaining the characteristic features of those disclosed in the specifications of the aforementioned U.S. patents in that portion of the present specification relating to the background of the invention, the diffusor 52 is preferably provided with a plurality of divided gas chambers 54, 55 and 56 so that the mass flow of fluidizing gas injected upwardly from these chambers may be regulated differently. Also, partition walls 58 are provided above the diffusor 52, the partition walls being positioned adjacent to but spaced from the side walls of the reactor 51 and each having a portion inclined upwardly and inwardly. The degree of inclination is preferably in the range of 10°–60° relative to the horizontal. With this arrangement of the diffusor 52 and the partition walls 58, when the gas or air is injected upwardly in such a manner that it is blown upwardly strongly in the opposite end chambers 54 and 56 while being blown upwardly relatively gently in the center chamber 55, the fluidizing medium is caused to produce substantially two circulating zones A and B which have circulating flows in opposite directions as indicated by the arrows. This is because the fluidizing medium is blown upwardly rather violently by the gas injected from the chambers 54 and 56 and is deflected inwardly by the partition walls 58 while the medium above the chamber 55 is blown upwardly rather weakly compared to the portions blown up by the gas from the chambers 54 and 56 and, the overall behavior of the medium is such that the medium above the chambers 54 and 56 moves upwardly while under fluidization by forming rising beds and the medium of the rising beds is deflected inwardly by the inwardly inclined portions of the partition walls 58, this inwardly directed medium, together with the medium above the chamber 55, tending to descend under relatively weak fluidization to form a descending bed under relatively weak fluidization, and the medium at the bottom of the descending bed being directed towards the bottoms of the rising beds. Thus, the materials to be burnt in the descending bed are entrained therein due to the presence of oppositely circulating zones A and B which ensure the entraining therein of even those materials which are light and those categories which are normally merely divided out and burnt on the upper surface of the fluidizing bed. Consequently, the latent thermal energy of such light materials can also be utilized to raise the temperature of the fluidizing bed. Suitable mass flows of the fluidizing gas from each of the chambers 54, 55 and 56 which are capable of effectively causing such circulating fluidized beds in the two zones A and B are, for example, 4–20 Gmf, more preferably 6–12 Gmf, from the chambers 54 and 56; and 0.5–3 Gmf, more preferably 1–2.5 Gmf, from the center chamber 55 (where 1 Gmf is an indication of the mass flow of the fluidizing gas for minimum fluidization of a bed,—i.e. just past the incipient condition). The number of chambers in the embodiment explained above is three, namely 54, 55 and 56. However, the number of chambers is not limited to three and further chambers may be provided as required to effectively generate rising beds between the rising beds in a circulating manner.

The above-mentioned circulating flows are also caused by the inclined partition walls 58.

Even in cases where the fluidizing gas is uniformly blown from the diffusor 52, the upward gas flow is directed along the inclined partition walls above the diffusor so as to cause similar circulating flows in the fluidizing medium. This is also caused by the fact that the gas flow is concentrated and accelerated at the upper zone to give greater momentum to the fluidizing medium.

The gas flowing upwardly from the upper ends of the inclined partition walls 58 flows through the upper surface of the fluidizing bed along with the entrained fluidizing medium. In this case, the gas flow entrains a larger amount of fluidizing medium than that with non-inclined partition walls. Thus a larger amount of fluidizing medium is conveyed to a thermal energy recovery chamber.

Figure 3:
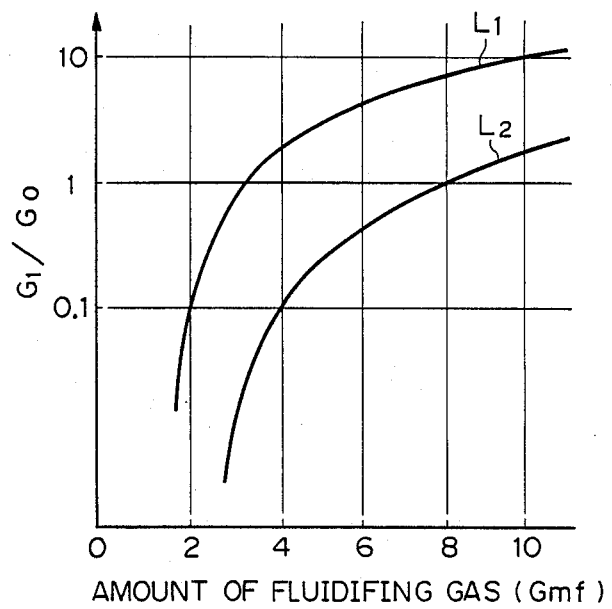
FIG. 3 is a graph showing the amount of fluidizing medium circulated through a thermal energy recovering chamber under variation of a fluidizing gas flow.

The relationship between the gas flow and the amount of conveyed fluidizing medium is shown in FIG. 3 of the drawings. An increase of the amount of conveyed fluidizing medium increases the maximum amount of thermal energy to be recovered, and also facilitates the thermal energy recovery.

Figure 2:
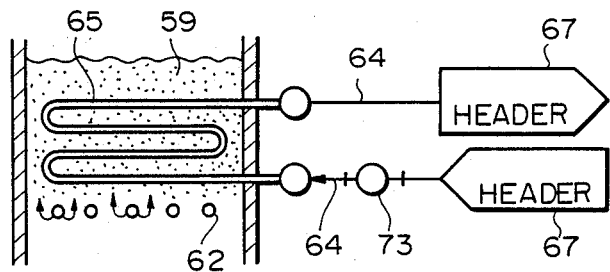
FIG. 2 is a schematic illustration of a part of the reactor shown in FIG. 1 as viewed in the direction II—II shown in FIG. 1.

Unlike the reactor of the prior art, at the side of each of the partition walls 58 and opposite the zones A and B, a chamber 59 is formed by the partition wall itself, the side wall of the reactor and a baffle 50 provided at a lower part of this chamber 59. It should be noted that the baffle 50 and the lower end of the partition wall 58 are arranged to be kept apart from each other with a gap 63 therebetween so that the fluidizing medium may freely pass through this gap and the baffle 50 serves to prevent the medium from being directed such as to be discharged outwardly. Provision of the chamber 59 is one of the primary features of the present invention; it is utilized as a thermal energy recovering chamber into which a part of the fluidizing bed under fluidization is directed. Within the chamber 59 is arranged a heat exchanger consisting of a thermally conductive tube 65 to be coupled through conduits 64 with e.g. an upper header and a lower header of the boiler 67 as schematically shown in FIG. 2, and the heat exchanger tube 65 recovers thermal energy from the heated fluidizing medium passing through the chamber 59 by means of fluid such as water which is caused to flow through the tube 65 by a pump 73. The position of the partition walls 58 is arranged to be such that the fluidizing gas injected from the diffusor 52 may not enter the chamber 59, and to prevent the possibility that any medium directed into the chamber 59 might just stay within the chamber without movement, which would inhibit effective heat exchange. In order to avoid such possibility and in order to assure proper movement of the medium within the chamber 59, an auxiliary diffusor 62 is disposed above the baffle 50 and a suitable pressurized gas source such as a blower 60 is connected to the diffusor through a conduit 61. The diffusor preferably extends sufficiently for the gas to be blown into the chamber 59 over the entire area of cross-section of the chamber 59. With the gas supplied from the diffusor 62, the medium directed into the chamber 59 moves downwardly, either periodically or continuously, depending on the operational condition of the circulating zones A and B. The medium moved downwardly in this way passes through the gap 63 between the baffle 50 and the partition wall 58 and merges into the circulating zones A and B whereby a certain volume of the medium heated in the zones A and B is constantly being fed to and passed through the chambers 59.

Figure 4:
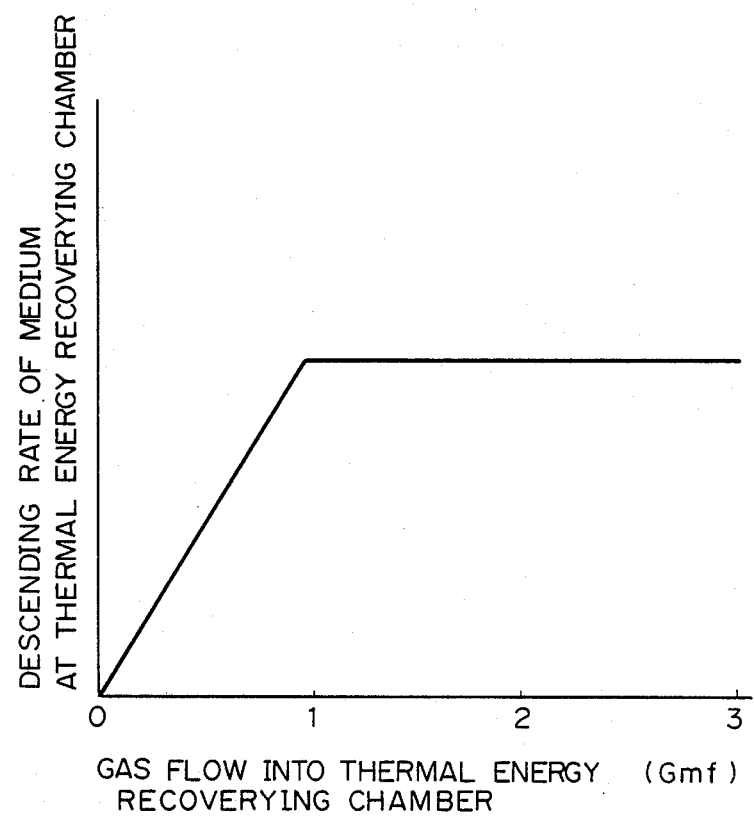
FIG. 4 is a graph showing variation in the descending rate of the fluidizing medium in the thermal energy recovering chamber.

Fluidizing medium circulated through the thermal energy recovering chambers 59 is dependent on and controlled by the amount of gas fed through the auxiliary diffusor 62 and the mass flow from the divided chambers of the diffusor 52, particularly those producing the rising beds, namely the chambers 54 and 56 in the embodiment shown in FIG. 1. Variation in the amount of fluidizing medium relative to the mass flow from the diffusor 52 and the auxiliary diffusor 62 is illustrated in FIGS. 3 and 4. As seen from FIG. 3, the volume of fluidizing medium increases as the mass flow of the fluidizing gas blown up from the diffusor 52 (particularly from the chambers 54 and 56 for producing the rising beds) is increased. In FIG. 3, the amount $G_1$ of the medium circulated through the thermal energy recovering chamber 59 is indirectly represented by the ratio of $G_1/G_0$ wherein $G_0$ represents a reference volume corresponding to the amount $G_1$ which is the value of case "$L_1$" at 3 Gmf flow of gas from the chambers 54 and 56. The Legend "$L_1$" in FIG. 3 corresponds to the case of fluidization where the height of the fluidizing medium of the diffusor 52 corresponds to the tops of the partition walls 58 while in a non-operative state. The Legend "$L_2$" corresponds to case of the fluidization where the height of fluidizing medium is lower than the case "$L_1$" by 10–20 percent and corresponds to the tops of the partition walls 58 while in an operative state.

From FIG. 4, it will be observed that the amount of the fluidizing medium circulating through the thermal energy recovering chamber 59 increases proportionately as the mass flow of the gas supplied from the auxiliary diffusor 62 increases in the range of 0–1 Gmf, and if the mass flow increases beyond 1 Gmf, the volume of the fluidizing medium stays at substantially the same level as that at the 1 Gmf level corresponding to $G_1$. The amount of fluidizing medium descending through the energy recovery chamber is dependent upon $G_1$. By properly adjusting the mass flow of the fluidizing gas from the diffusor 52 and the gas supplied through the auxiliary diffusor 62, the amount of fluidizing medium circulated through the thermal energy recovering chamber 59 can be regulated.

In the thermal energy recovering chamber 59, the thermal energy of the fluidizing medium heated in the zones A and B is transferred to a fluid flowing through the heat conductive tube 65 for recovering thermal energy. The overall coefficient of heat transfer at the thermal energy recovering chamber is shown as a curve I in FIG. 5 relative to the mass flow of the gas blown into the chamber 59.

In order to control the amount of thermal energy to be recovered, the amount of fluidizing medium circulating as well as the overall coefficient of heat transfer are regulated. That is, assuming that the fluidizing gas directed toward zones A and B is maintained constant with respect to the volume thereof, the amount of fluidizing medium circulated through the thermal energy recovering chamber 59 and the overall coefficient of heat transfer both increase as the amount of gas blown into the chamber 59 is increased, and thus the total recovery of thermal energy is greatly enhanced by the increased gas flow into the chamber 59. However, if the gas flow is increased too much, the decreasing tendency shown by the curve I in FIG. 5 would occur and violent gas flow would cause abrasion of the tube 65. The abrasion rate of the tube is also plotted in FIG. 5 as a curve II. From the curves I and II, it will be seen that the gas flow from the auxiliary diffusor is preferably up to 3 Gmf. The efficient thermal energy recovery in the chamber 59 also makes it possible to suppress excessive heating of the fluidizing medium in zones A and B.

Now before proceeding to an explanation of the operation of the reactor, some further explanation is given regarding the structure of certain portions associated with the reactor 51. At the top of reactor 51, an inlet opening 66 is provided for charging objects F to be incinerated, such as municipal waste, into the reactor 51. In a case where the reactor 51 is solely used for burning fuel, such as coal or petroleum-coke, such fuel is directly fed to the zones A and B. Also at the upper part of the reactor, an exhaust opening 68 is provided for discharging exhaust gas, the thermal energy of the exhaust gas being utilized in this case for the boiler 67 which is coupled to the tube 65 in the thermal energy recovering chamber 59 as illustrated in FIG. 2. At the bottom of the boiler 67, there is a discharge port for discharging ash. A discharge means is of course provided in the reactor 51 for discharging incombustible residue from the reactor. A discharge passage 69 is provided at the lower part of the reactor at one side, or at each of two opposite sides, of the diffusor 52 so that the incombustible residue may be directed toward a screw conveyor 70 which conveys the residue axially by means of oppositely oriented screw blades 71 to a discharge opening 72.

Turning now again to the fluidizing function of the reactor, the circulating zones A and B are produced as a result of the arrangement of the partition walls 58 and the difference in the mass flow from the main diffusor 52 with respect to the horizontal direction.

However, it may be said in an operative state that the mode of this fluidization varies depending on the position of the upper level of the fluidizing bed. If the upper surface of the fluidizing bed is below the level of the top of the partition walls 58, the gas blown up and the part of the fluidizing medium which is in the rising bed portion and caused to move upwardly to the opposite side by virtue of the inclined portion of the partition walls 58 and, thus, the part of the fluidizing medium in the rising bed may fly upwardly above the surface of the fluidizing bed and reach the thermal energy recovering chamber 59 at the opposite side. The gas may then become diffused with a reduction in its velocity in a free board C incorporated in the reactor 51 and is discharged outwardly through the boiler 67 where the thermal energy of the gas is utilized to generate vapor in the boiler. The fluidizing medium flies upwardly as described above but, due to its grain size of or specific gravity, all of the medium which is blown upwardly above the surface of the fluidizing bed may not in fact reach the chamber 59 at the opposite side unless the width of the reactor is kept relatively narrow, say under 1–2 meters. Therefore, in a case where the upper surface of the fluidizing bed is below the level of the top of the partition walls 58, the amount of fluidizing medium delivered to the thermal energy recovering chambers 59 may not be enough to allow the thermal energy to be efficiently recovered while maintaining the temperature of the medium at an appropriate level.

On the other hand, if the upper surface of the fluidizing bed is higher than the level of the top of the partition walls 58, the fluidizing gas gathered at the center of the bed by the inclined portions of the partition walls 58 will be blown upwardly with a part of the fluidizing medium. The fluidizing medium thus blown upwardly exhibits movement as indicated by arrows "a" in FIG. 1 whereby the fluidizing medium heated in the zones A and B will be fed to the thermal energy recovering chambers 59 in a quantity which is sufficient for effectively recovering the energy as well as allowing the temperature of the fluidizing medium to be maintained at an appropriate level. As the position of the upper surface of the fluidizing bed becomes higher, rising above the top of the partition walls 58, the amount of fluidizing medium fed into the thermal energy recovering chambers 59 is increased as shown by curves $L_1$ and $L_2$ in FIG. 3. However, the rate of such increase is high when the upper surface of the bed varies at the region near the top level of the partition walls 58 and decreases as the upper surface of the fluidizing bed becomes remote from the top level of the partition walls 58. The fluidizing medium thus fed to the thermal energy recovering chambers moves downwardly through the chambers 59 and merges again through the gaps 63 with the rising beds of the zones A and B where the medium is heated again. In this way circulation of the medium through the chambers 59 is continued while effecting the recovery of the thermal energy and maintaining the proper temperature of the fluidizing medium. If the rate at which the medium within the chambers descends is slow, the medium may accumulate up to a maximum value defined by an angle of repose above the chamber 59 and the excess medium beyond this angle of repose will fall into the zones A and B. The descending movement of the medium within the chambers 59 is assisted by the gas supplied from the auxiliary diffusor 62, as explained before and as described above with reference to FIG. 4, and the fluidizing medium descends while being accompanied by relatively gentle fluidization provided by the gas supply from the diffusor 62.

Taking the overall coefficient of transfer and the abrasion rate of the heat exchanging tube 65 into consideration, the mass flow of the gas supply from the auxiliary diffusor 62 is determined to be in the range of 0–3 Gmf and more preferably 0–2 Gmf. The reason for the above determination is that the overall coefficient of heat transfer is variable between a maximum value and a minimum value when the mass flow is below 3 Gmf and the abrasion rate with respect to the heat exchanger tube is quite low in the range mentioned above, as evidenced by FIG. 5. Also, if the reactor 51 is simply intended to incinerate objects F charged thereinto and no vapor need be produced, the mass flow from the auxiliary diffusor 62 may be made zero so that there is substantially no movement of the medium within the chamber 59 in accordance with FIG. 4 and the reactor 51 may thus be operated solely for the purpose of incineration. It is quite advantageous to be able to control the mass flow from the auxiliary diffusor 62 to remain at zero. This zero state of the mass flow makes it possible to stop the recovery of thermal energy. Such condition may be required at the stage of starting the operation of the reactor or after shutting down the reactor when the temperature of the fluidizing zones need to be raised. Also, should the necessity for generating vapor be decreased remarkably, thermal recovery would become unnecessary. In some cases, the mass flow from the auxiliary diffuser may be made to reamin at zero on a single side of the reactor.

The arrangement of the thermal energy recovering chamber 59 provides the further advantage in that the surface of the heat exchanging tube 65 may be disposed outside of the main incineration zones A and B. This means that the surface of tube 65 will not be subjected to highly corrosive atmosphere such as a reducing atmosphere and also will not be subjected to the severe abrading effect which occurs in the main fluidizing bed zones A and B.

In fact, the velocity of the gas in the thermal energy recovering chamber 59 is relatively slow, such as an the order of 0.1–0.4 m/sec at a superficial velocity under the conditions that the temperature of the fluidizing medium is approx. 800° C.; and the mass flow from the auxiliary diffusor is in the range of 0.5–2 Gmf.

The heat transfer in the thermal energy recovering chamber 59 is effected not only by the direct contact between the fluidizing medium and the heat exchanging tube 65 but also by utilizing the gas moving upwardly as a transfer medium i.e. the gas moving upwardly under vibration through the fluidization mode of the fluidizing medium. Since in such heat transfer through the gas there is no boundary layer such as exists on a stationary surface and which usually inhibits the occurrence of heat transfer on the surface of a solid article, and since the fluidizing medium is well mixed, the amount of heat transfer which occurs within the fluidizing medium reaches a substantially negligible level, so quite efficient heat transfer may be expected in the present invention. Accordingly, the overall coefficient of heat transfer in the thermal energy recovering chamber according to the present invention may be made as large as ten times that achievable in a conventional gas combustion boiler.

As discussed above, the heat transfer between the heat exchanging means, such as the tube 65, and the fluidizing medium largely depends on the mode of fluidization in the recovering chamber, and the amount of fluidizing medium utilized may also be regulated by the gas supply from the auxiliary diffusor as illustrated in FIG. 4. Also, heat transfer is variable as shown in FIG. 3 depending on the fluidization mode in the main fluidization zones. With the thermal energy recovering chamber being provided independently of the main fluidizing zones, it becomes possible to design the reactor to be compact while ensuring that the thermal energy can be effectively recovered, and it also becomes easy to control the reactor by increasing the turn down ratio of the vapor generated by the boiler associated with the reactor.

Furthermore, in the conventional type of boiler in which coal or petroleum-coke is used as a fuel at a relatively slow incineration rate, rapidly effected control of the amount of vapor to be produced is not easy and in practice the amount provided merely depends on the incineration rate or even worse since thermal energy recovery is effected through a fluidizing bed in the case of a boiler employing a fluidizing bed. However, in a boiler accompanied by the reactor according to the present invention, the heat transfer in the thermal energy recovering chamber may be instantaneously varied and controlled within a wide range by varying the amount of diffusion gas supplied from the auxiliary diffusor. While there will of course be a time delay in effecting the variation of thermal energy input into the fluidizing bed due to variations in the volume of the objects to be charged therein, the difference in response between the thermal energy input variation and the amount of thermal energy recovered may be absorbed by the temporary change in the temperature of the fluidizing medium. Accordingly, it is possible to regulate the amount of vapor produced in the boiler with a quick response when the reactor according to the present invention accompanies the same.

Figure 6:
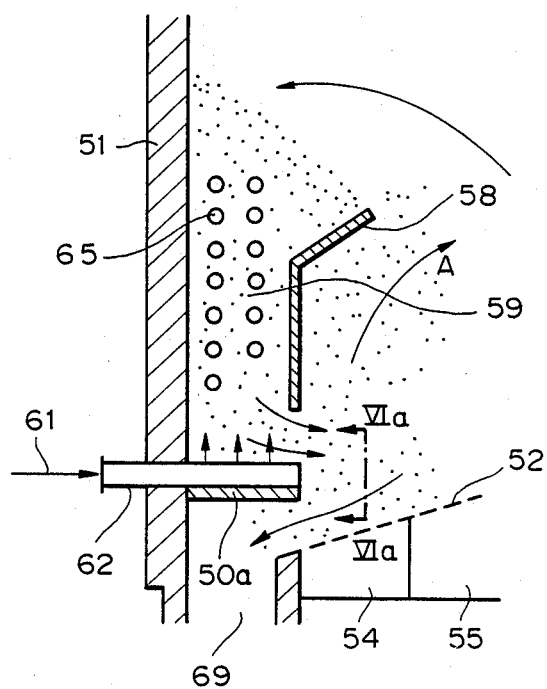
FIG. 6 is an enlarged sectional view of the thermal energy recovering chamber shown in FIG. 1.
Figure 6A:
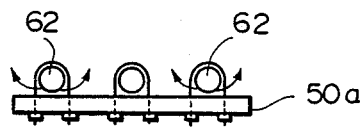
FIG. 6A is a view seen in the direction VIa—VIa shown in FIG. 6.

In the foregoing embodiment shown in FIG. 1, the discharge passage 69 is shown as being disposed adjacent and below the gap 63 between the lower end of the partition wall 58 and the baffle 50. However, the location of the passage 69 is not limited to that illustrated in FIG. 1. Also, the baffle 50 need not necessarily be provided in a form similar to that shown, provided that the fluidizing medium is retained in the chamber 59 without being directly discharged towards the discharge passage 69. For example, a plate 50a as shown in FIGS. 6 and 6A may be used instead of the baffle 50 shown in FIG. 1 wherein the baffle 50 is a part of the wall of the reactor 51.

As to the diffusor 52 shown in FIG. 1, it has been explained or illustrated as being comprised of plural chambers 54, 55 and 56 capable of producing different amounts of mass flow of the fluidizing gas in each, whereby the rising fluidizing beds are generated at the portions adjacent the partition walls of the reactor while the descending fluidized bed is generated centrally so that overall the circulating zones A and B of the fluidizing medium are formed. However the diffusor 52 may optionally have further chambers, or it may be constructed to have a single chamber, provided in each case that suitable variation in the mass flow of the fluidizing gas is obtained so as to produce the circulating fluidized zones A and B. Such may be achieved with a diffusor 52′ having only a single chamber such as that schematically illustrated in FIG. 1A wherein the same reference numbers as those used in FIG. 1 are employed for convenience to indicate elements having the same respective functions.

The requisite difference in the mass flow of the fluidizing gas may be produced by changing the size of the perforations in the top of the diffusor 52′ or by changing the distribution density of the perforations. Also, the configuration of the diffusor 52 illustrated in FIG. 1 has a chevron shape which may be found to assist circulation of the fluidizing bed as well as movement of incombustible residue towards the discharge passage 69. The inclination of the top surface thereof may be 5°–15° relative to the horizontal when the objects F to be incinerated contain incombustibles. However, such a chevron shape is not a mandatory requirement and the fluidizing medium may circulate even with a diffusor 52′ having a flat top surface since the presence of the rising fluidizing beds and the center descending bed cause the fluidizing medium at the bottom of the descending bed to move laterally towards the lower portion of the rising fluidizing bed. Also, if the reactor is used to incinerate objects which do not generate any substantial amount of incombustible residue, the illustrated chevron shape of diffusor may not be required. Instead it may be flat as in the case of the diffusor 52′ shown in FIG. 1A and the discharge passage such as the passages 69 may either be simplified or omitted provided that an access means for replacing the fluidizing medium and cleaning the inside is provided.

Figure 7:
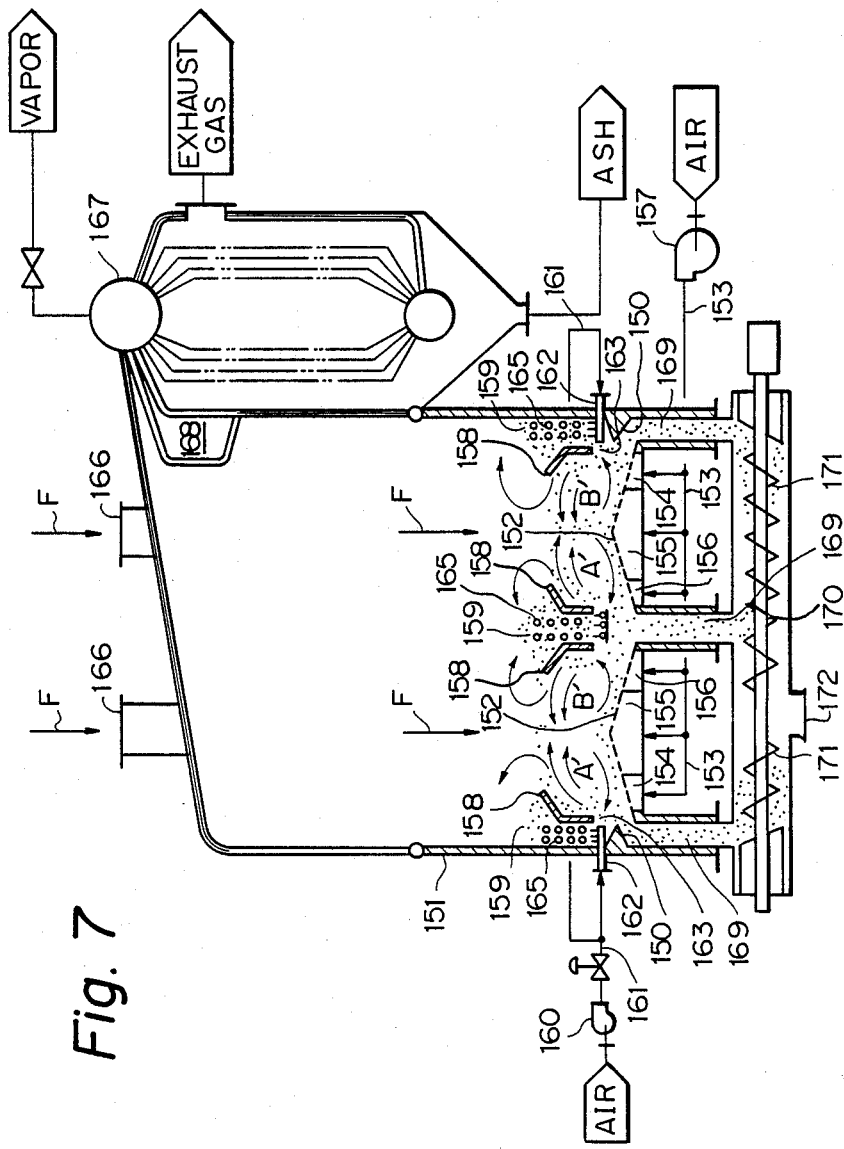
FIG. 7 is a schematic illustration of a heat reactor constructed in the form of a tandem type according to the present invention.

In FIG. 7, another embodiment according to the present invention is schematically shown in which a reactor 151 is constructed to have two fluidizing bed chambers each of which is substantially similar to that shown in FIG. 1. For the sake of convenience, the same reference numerals as those employed in FIG. 1 with the prefix 1 added thereto are used in relation to this embodiment, and the respective functions of these elements may be considered the same as the corresponding elements appearing in FIG. 1 without the prefix 1. In this embodiment, circulating zones A′ and B′ each are generated in two fluidizing chambers. The central thermal energy recovering chamber 159 is formed by a pair of adjacent partition walls 158. The diffusors 152 are illustrated as comprising divided chambers 154, 155 and 156; however, a diffusor comprising a single chamber such as the diffusor 52′ shown in FIG. 1A may alternatively be employed in the embodiment of FIG. 7 also.

Figure 8:
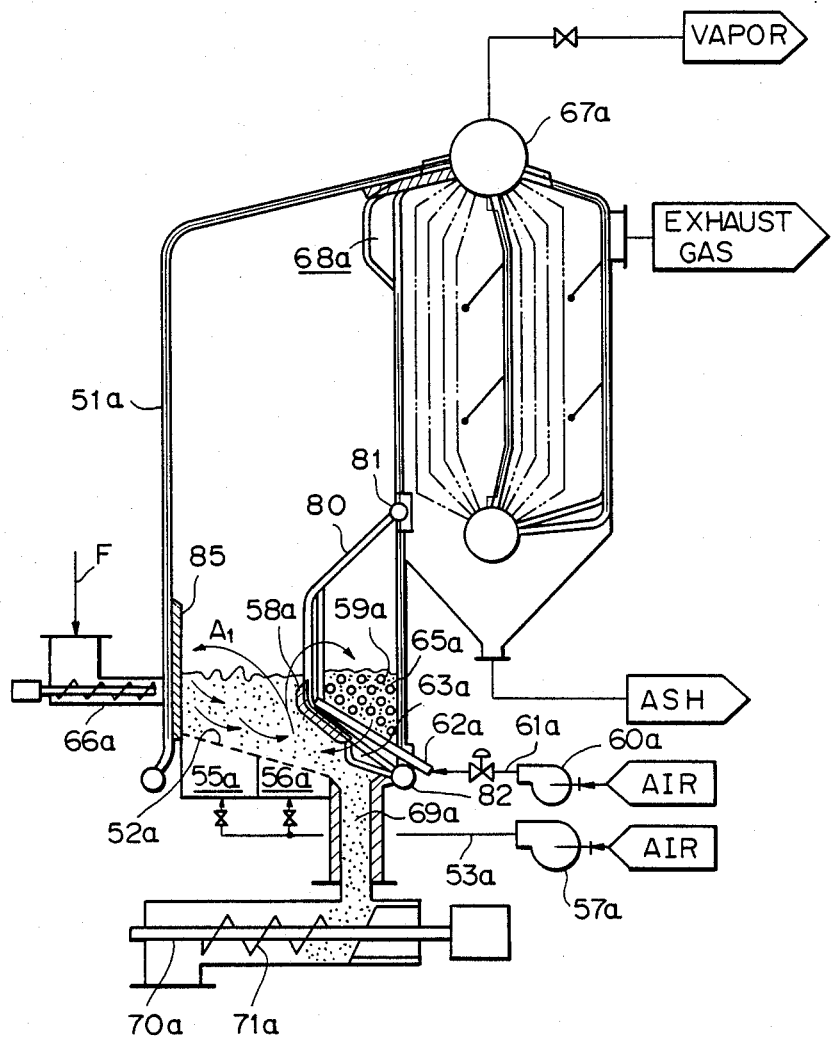
FIG. 8 is a modified schematic illustration of a heat reactor according to the present invention wherein a separator wall is supported by water tubes.

Other embodiments are further explained below. In FIG. 8, a reactor 51a is illustrated in which fluidization provided by a diffuser 52a generates a single fluidizing zone A. Those elements or parts having the same function as the corresponding ones in FIG. 1 are given the same reference numerals as in FIG. 1 with the suffix "a" added thereto. The circulating zone $A_1$ is produced by the diffusor 52a comprising divided chambers 55a and 56a from which different mass flows of fluidizing gas are injected upwardly, the gas flow from the chamber 56a being stronger than that from the chamber 55a. The difference in the upward gas flow will produce the circulating fluidizing zone $A_1$ in the presence of the partition wall 58a having an inclined portion. In this reactor 51a, it is to be noted that the walls of the reactor are constructed as a so-called membrane wall, i.e. a welded wall comprising water tubes joined together by webs. As seen in FIG. 8, a protecting member 85 is disposed inside the welded wall at the portion facing the circulating fluidizing zone $A_1$ so as to protect the welded wall from abrasion by the fluidizing medium. The partition wall 58a is also made resistant to abrasion and supported in place, in this instance by water tubes 80 which merge with the welded wall through headers 81 and 82.

Figure 9:
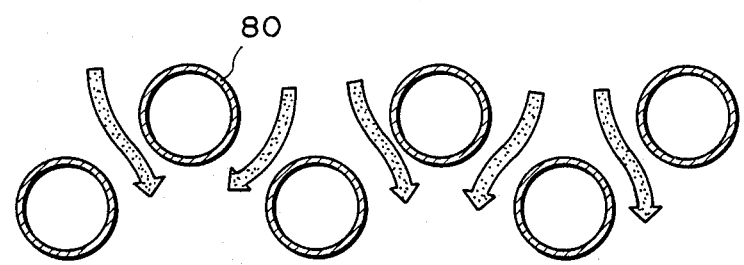

The water tubes 80 are bent in at least one portion. The thermal expansion of the tubes will be absorbed at these bent portions. The tubes 80 are also secured to the headers 81 and 82 which are adapted to withstand the violent motion of the fluidizing bed in motion. Further, the straight portions of these tubes extend upwardly through the upper surface of the fluidizing medium to a height sufficient to ensure that they will prevent incombustible residue from piling up against the partition wall 58a and to reduce the resistance of the fluidizing medium passing through the gaps between the tubes 80. The straight portions of the tubes 80 and the portions in the gap 63a may be arranged in a staggered or zig-zag fashion as schematically illustrated in FIG. 9, wherein the arrows indicate the flow of the fluidizing medium. This enables fluidizing medium to flow. While the diffusor 52a in FIG. 8 has been explained as comprising two diffusion chambers 55a and 56a for producing different mass flows upwardly, the diffusor 52a in this instance may also be replaced with a single chambered diffusor by employing an idea similar to that employed in the diffusor 52' illustrated in FIG. 1A.

Figure 1A:
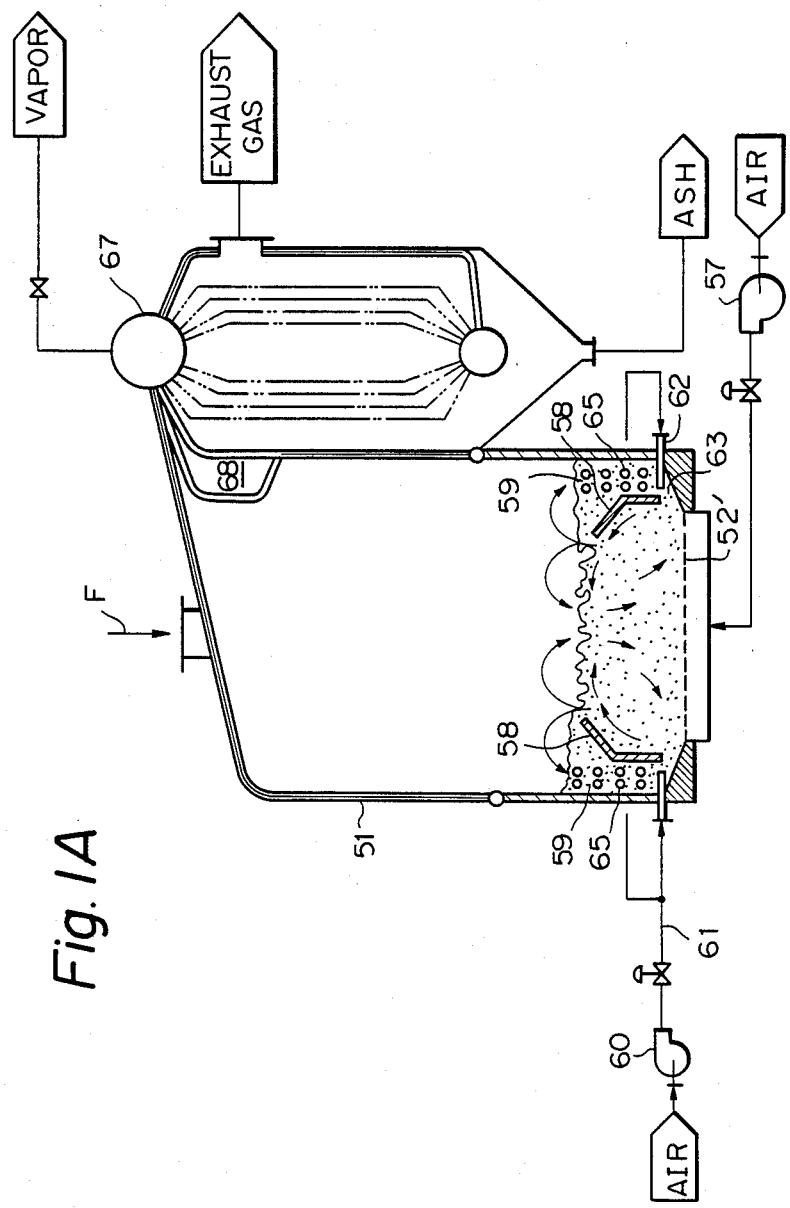
FIG. 1A is a similar view but of a modified version of the reactor shown in FIG. 1.

The arrangement of the water tubes 80 and the welded walls illustrated in FIG. 8 may also be applied in the reactors shown in the preceding embodiments, for example the reactors 51 shown in FIGS. 1 and 1A, and the reactor 151 shown in FIG. 7.

Figure 10:
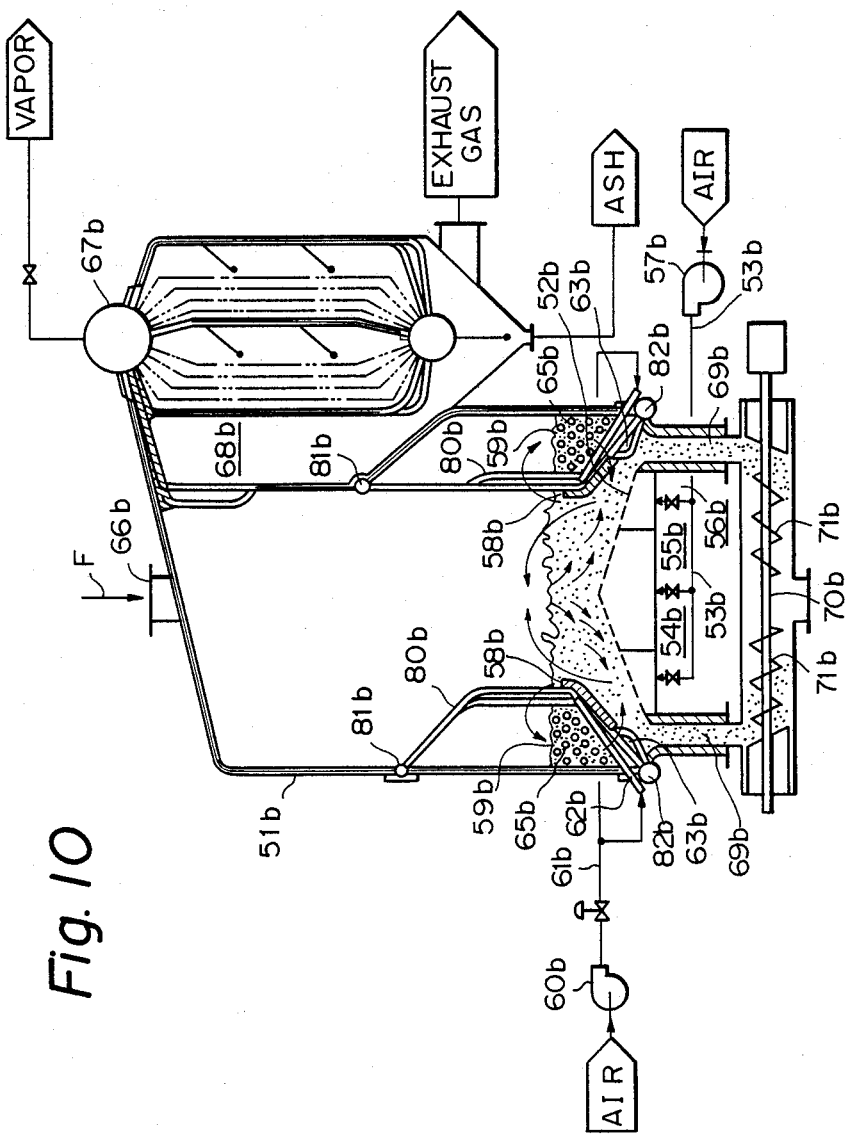
FIG. 10 is a schematic illustration of a further modification of what is shown in FIG. 8.

For the purpose of illustration, a schematic illustration of a reactor 51b is shown in FIG. 10. The reactor 51b is similar to the previously described reactor 51 except that an arrangement of water tubes and the welded tube explained in connection with FIG. 8 is incorporated therein. In explaining this embodiment the suffix "b", is added to those elements having the same function as those shown in FIG. 1 and FIG. 8. The same construction could also be applied to the tandem type reactor such as that shown in FIG. 7, in which case the water tubes surrounding the central thermal energy recovering chamber would be connected to additional headers which may be supported by a welded wall and or water tubes disposed vertically between the two fluidizing chambers in such a way that each of the free boards provided communicate with each other.

Figure 8A:
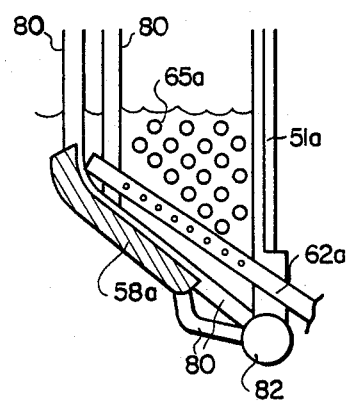
FIG. 8a is an enlarged view of a part of FIG. 8.

Further modification around the thermal energy recovering chamber is shown in FIG. 8a which corresponds to a part of FIG. 8 wherein the heat exchanging tubes 65a are preferably arranged to be provided in a staggered fashion. Also, the auxiliary diffusor 62a is arranged to take the form of a tube and is preferably disposed along the partition wall 58a; the advantage of this arrangement will be explained below.

Several means may be considered for introducing fluidizing gas into the chamber 59. In general, as shown in FIG. 6, the diffusor 62 is disposed horizontally. If the perforations of the diffusor are made to be identical in size, the gas will be supplied with uniform mass flow over the entire horizontal base of the chamber 59. Therefore, in this instance, the fluidizing medium in the chamber 59 will change its mode gradually from the stationary state to the fluidizing state as the mass flow of the gas supplied to the diffusor 62 is gradually increased. As explained in connection with FIG. 5, the overall coefficient of heat transfer exhibits great variation at the region adjacent 1 Gmf. Thus, if it is attempted to control the amount of heat transfer by means of the diffusor shown in FIG. 6, it would in practical terms involve three steps in accordance with FIG. 5, namely at a point adjacent 1.5 Gmf where the heat transfer is at its maximum, at a point below 1 Gmf where the heat transfer is small, and at a point where the mass flow is zero where the heat transfer is minimal.

Figure 11A:
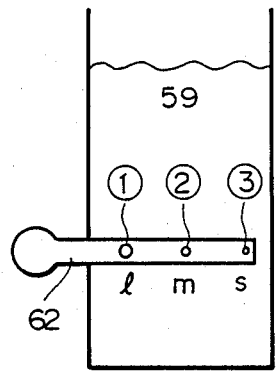
FIGS. 11A, 11B and 11C are schematic views showing variations of a diffusor.
Figure 11B:
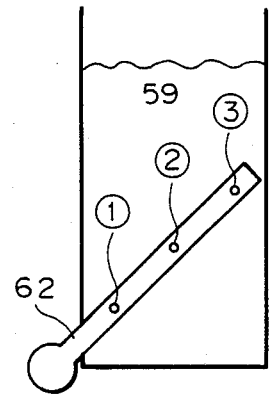
Figure 11C:
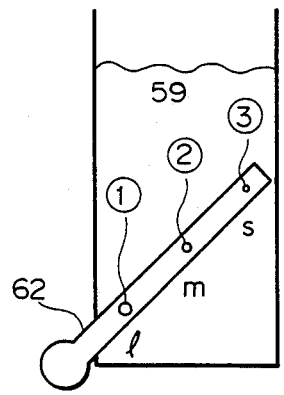
Figure 12A:
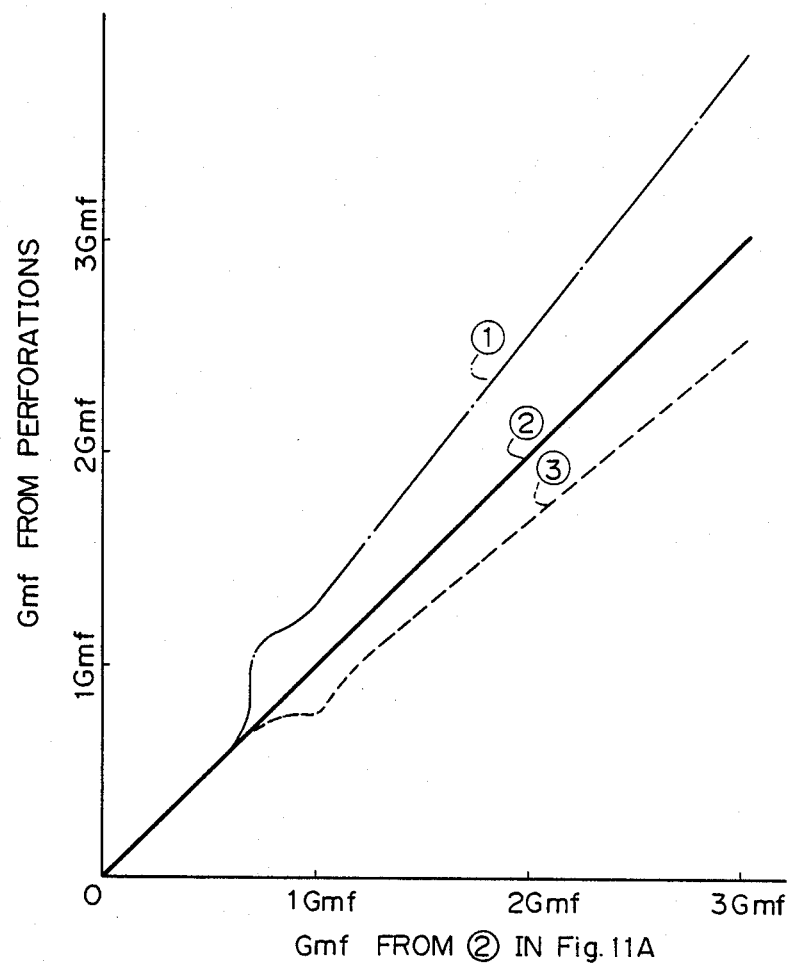
FIGS. 12A, 12B and 12C are graphs showing the trend of changes in the fluidizing gas corresponding to the arrangements shown in FIGS. 11A, 11B and 11C, respectively.
Figure 12B:
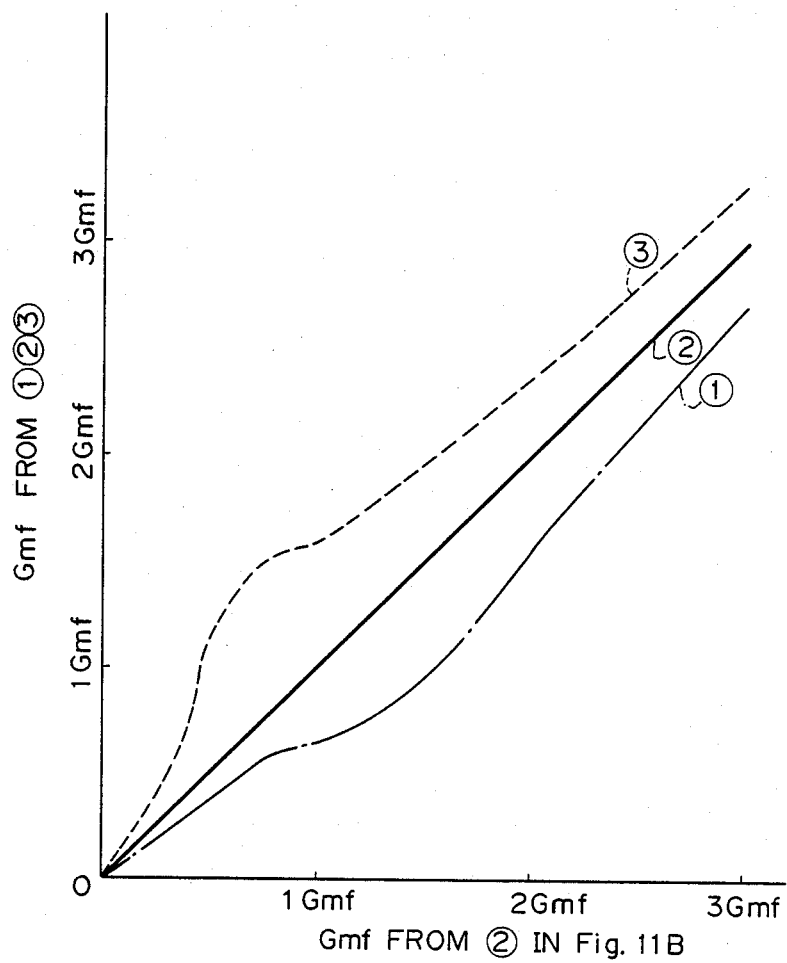
Figure 12C:
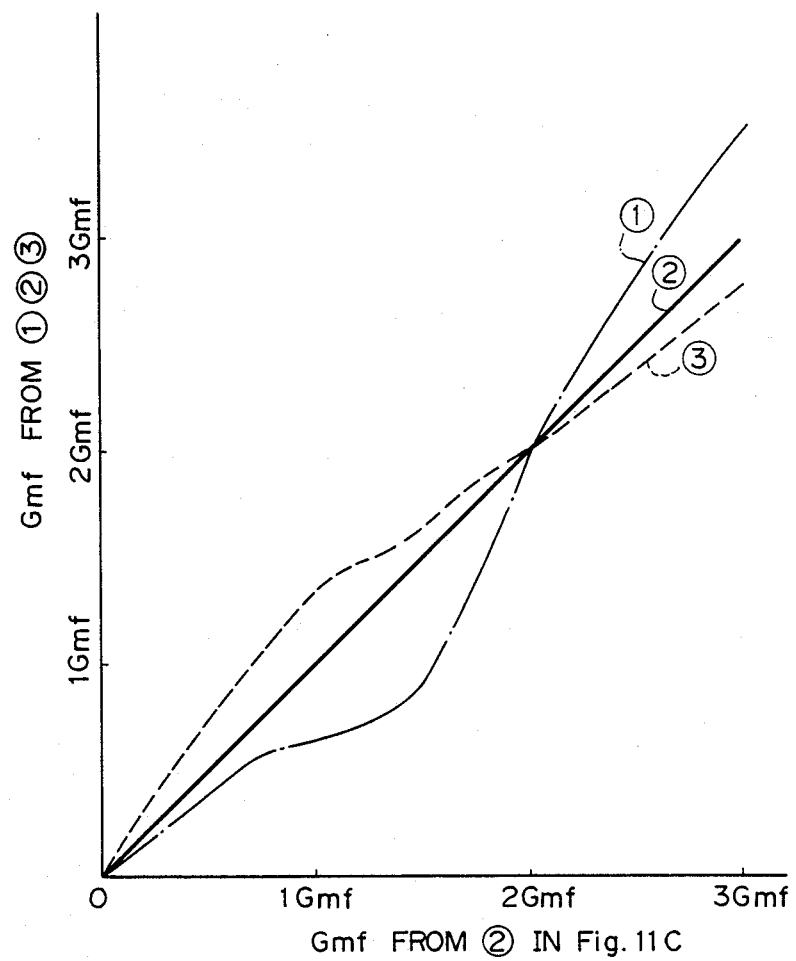

In contrast to the above, in a case where the gas is supplied with non-uniform mass flow over the horizontal base of the chamber 59, such as, where the perforations of the diffusor are made different in various portions or if it is disposed in an inclined fashion with or without variation in the size of the perforations, the fluidization mode may be made to have more variety. Several such examples are schematically illustrated in FIGS. 11A, 11B and 11C. In FIG. 11A, the tube or diffusor 62 is disposed horizontally with the perforation sizes varying from large (1), to medium (m) and to small (s). In FIG. 11B, the tube 62 is inclined with perforations of even size which corresponds to the situation shown in FIG. 8a. FIG. 11C shows an inclined tube 62 having different sized perforations (1, m, s). For the sake of convenience, each of the perforations is marked with the symbols ①, ② or ③. To show variety of fluidization which is possible, FIGS. 12A, 12B and 12C are presented and these correspond to FIGS. 11A, 11B and 11C, respectively. Each of FIGS. 12A, 12B and 12C is shown relative to the mass flow from the middle perforation ②. With these illustrations, it will be understood that the arrangement shown in FIG. 11C is relatively preferable. The relationship between the mass flow and the heat transfer is shown in FIG. 13 with respect to the arrangements in FIGS. 6 and 11C. From FIG. 13, it will be evident that the FIG. 11C arrangement is preferable in that, at 2 Gmf, all the perforations inject the same value of mass flow and the heat exchanger tubes receive only minor abrasion with efficient heat transfer taking place.

Figure 5:
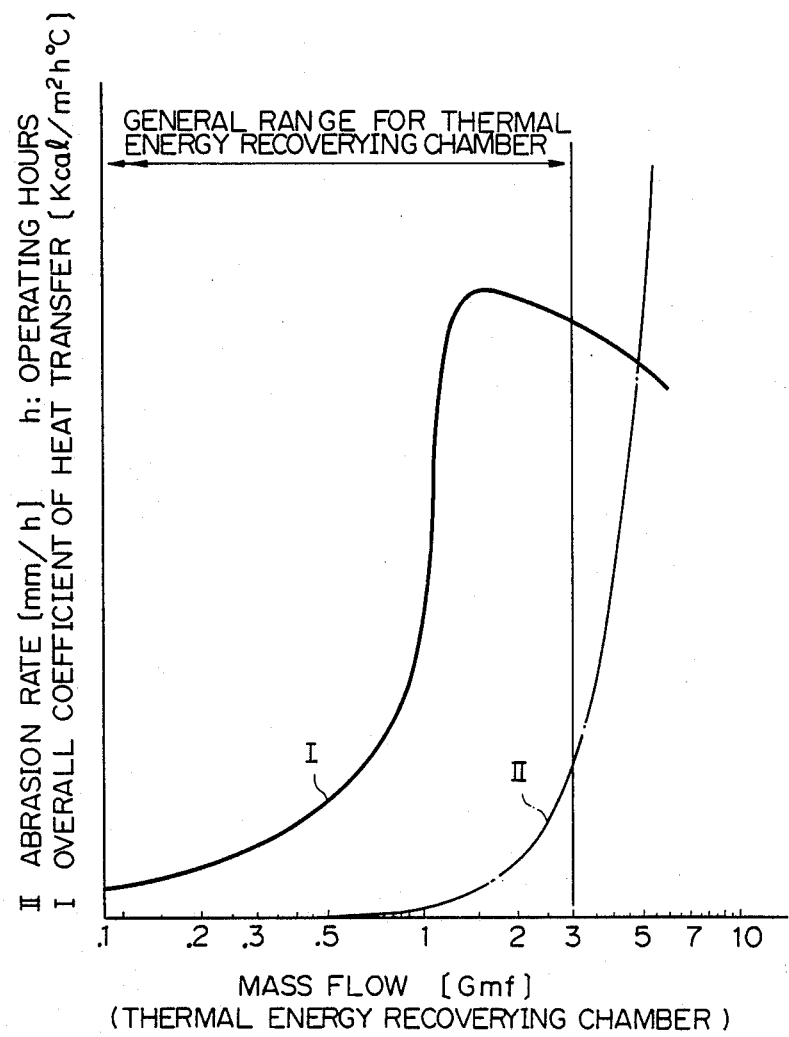
FIG. 5 is a graph showing curves presenting the "overall coefficient of heat transfer" and "abrasion rate" of a heat exchanging tube.
Figure 14A:
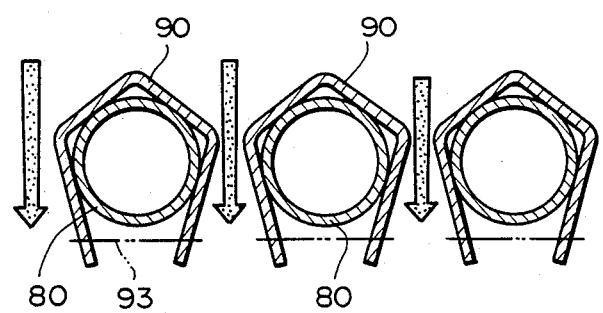
FIGS. 14A and 14B respectively are cross-sectional and perspective views showing the installation of protective members for the water tubes.
Figure 14B:
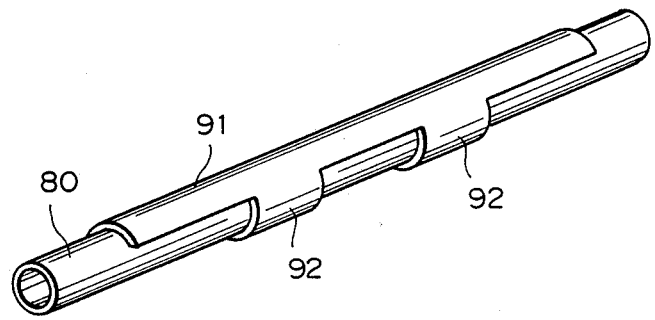

The abrasion experienced by the heat exchanger tube 65 has been considered in connection with FIG. 5. To protect the water tubes 80 adjacent the partition wall 58a against abrasion, a protector 90 or 91 is disposed on each tube 80 on the upstream side thereof. Such protectors are schematically shown in FIGS. 14A and 14B. The protectors 90 or 91 are made of heat resistant steel plate and are suitably bent as shown in FIG. 14A or formed as a semi-cylindrical shell and attached to a water tube 80 by a fastener or periodically secured by a short shell 92 welded to the protector 91.

When it is desirable to decrease the minimum thermal recovery to be as small as possible, it is preferable to form the protector 91 with a thermal insulator so as to decrease heat transfer to the water tube.

As to the position of the partition wall 58a (FIG. 8), the lower end of this partition wall is preferably disposed where the fluidization medium in the zone $A_1$ does not undergo such violent fluidization so as to make it easy to control the descending rate of the fluidization medium in the recovering chamber 59a. In a case where the reactor is used to incinerate coal or coke, it is preferable to directly charge the fuel into the fluidization zone $A_1$ where the moving direction of the fluidization medium is downward since the objects to be burnt are scraped off by the fluidizing medium and any air leak from the charger 66a is minimized. Further, at the time of shutting off the operation of the reactor, the fluidizing medium in the reactor acts as a seal with respect to air leakage and, thus, the objects remaining within the reactor do not need to be incinerated such as to burn the charging portion so that there is no necessity to close the gap between the charger and the reactor by such means as a chamber.

Incidentally, in the foregoing explanation, water is extracted from the boiler 67 and is forcibly circulated by the pump 73 (FIG. 2) and again returned to the boiler 67. However, the reactor may be used as an economizer for the purpose of pre-heating the water to be supplied to the boiler, or used for heating an independent boiler or a super heater for the vapor generated by a boiler. Particularly when it is used as a super heater, this arrangement is quite desirable since the possibility of corrosion is minimized. It should also be noted that a thermal medium such as oil may be employed as a circulating fluid for bearing thermal energy in lieu of water or vapor.

The heat exchanger tubes 65 and 65a etc. have been described in the explanation of all of the embodiments, but in fact such tubes may not be required in a case where the thermal recovery effected by the water tubes 80 and/or welded wall (membrane wall) is sufficient for the required purpose such as incinerating municipal waste or low grade coal.

The present invention has been explained in detail by referring to specific embodiments. However, the present invention is not limited to those explained and may be changed or modified by those skilled in the art within the spirit and scope of the present invention which is defined in the claims appended hereto. For example, the arrangements shown in FIGS. 11A, 11B and 11C may be made differently, not only in the inclined direction but also in a horizontal direction perpendicular to the plane of the paper on which such drawings are shown.

What is claimed is:

1. A thermal reactor comprising:
   a fluidizing bed chamber surrounded by walls;
   a fluidizing medium provided in said fluidizing bed chamber;
   diffusor means, at the bottom of said reactor below said fluidizing medium and coupled to a pressurized gas source, for blowing gas upwardly above said diffusor means into said fluidizing medium;
   partition wall means disposed in said fluidizing bed chamber adjacent to but spaced from said walls of said reactor or another partition wall means to form a recovery chamber with openings both at the top and the bottom communicating with said fluidizing bed chamber;
   heat exchanging means disposed in said recovery chamber; and
   auxiliary diffusor means for directing a pressurized gas into said recovery chamber, said auxiliary diffusor means being disposed horizontally and provided with perforations, the size of the area of said perforations increasing in a direction from a first end of said auxiliary diffusor means extending into said recovery chamber to a second end thereof.

2. A thermal reactor comprising:
   a fluidizing bed chamber surrounded by walls;
   a fluidizing medium provided in said fluidizing bed chamber;
   diffusor means, at the bottom of said reactor below said fluidizing medium and coupled to a pressurized gas source, for blowing gas upwardly above said diffusor means into said fluidizing medium;
   partition wall means disposed in said fluidizing bed chamber adjacent to but spaced from said walls of said reactor or another partition wall means to form a recovery chamber with openings both at the top and the bottom communicating with said fluidizing bed chamber;
   a heat exchanging means disposed in said recovery chamber; and
   auxiliary diffusor means for directing a pressurized gas into said recovery chamber, said auxiliary diffusor means being inclined with respect to the horizontal and having perforations, the size of the area of said perforations increasing in a direction from a first end of said auxiliary diffusor means extending into said recovery chamber to a second end thereof.

3. A thermal reactor comprising:
   a fluidizing bed chamber surrounded by walls;
   a fluidizing medium provided in said fluidizing bed chamber;
   diffusor means, at the bottom of said reactor below said fluidizing medium and coupled to a pressurized gas source, for blowing gas upwardly at different mass flows in different areas above said diffusor means and thereby for generating a circulating zone of a fluidizing bed in said fluidizing bed chamber;
   partition wall means disposed in said fluidizing bed chamber adjacent to but spaced from said walls of said reactor or another partition wall means to form a recovery chamber with openings both at the top and the bottom communicating with said fluidizing bed chamber;
   a heat exchanging means disposed in said recovery chamber; and
   auxiliary diffusor means for directing a pressurized gas into said recovery chamber, said auxiliary diffusor means being disposed horizontally and provided with perforations, the size of the area of said perforations increasing in a direction from a first end of said auxiliary diffusor means extending into said recovery chamber to a second end thereof.

4. A thermal reactor comprising:
   a fluidizing bed chamber surrounded by walls;
   a fluidizing medium provided in said fluidizing bed chamber;
   diffusor means, at the bottom of said reactor below said fluidizing medium and coupled to a pressurized gas source, for blowing gas upwardly at different mass flows in different areas above said diffusor means and thereby for generating a circulating zone of a fluidizing bed in said fluidizing bed chamber;
   partition wall means disposed in said fluidizing bed chamber adjacent to but spaced from said walls of said reactor or another partition wall means to form a recovery chamber with openings both at the top and the bottom communicating with said fluidizing bed chamber;
   a heat exchanging means disposed in said recovery chamber; and
   auxiliary diffusor means for directing a pressurized gas into said recovery chamber, said auxiliary diffusor means being inclined with respect to the horizontal and having perforations, the size of the area of said perforations increasing in a direction from a first end of said auxiliary diffusor means extending into said recovery chamber to a second end thereof.

5. A thermal reactor comprising:
   a fluidizing bed chamber surrounded by walls;

diffusor means, at the bottom of said reactor and coupled to a pressurized gas source, for blowing gas above said diffusor means;

partition wall means disposed in said fluidizing bed chamber adjacent to but spaced from said walls of said reactor or another partition wall means to form a recovery chamber with openings both at the top and the bottom communicating with said fluidizing bed chamber;

said partition wall means including an inclined partition wall provided above said diffusor means for generating a circulating zone of a fluidizing bed in said fluidizing bed chamber;

a heat exchanging means disposed in said recovery chamber; and auxiliary diffusor means, arranged to extend above said inclined partition wall, for directing pressurized gas into said recovery chamber.

6. A thermal reactor comprising:
a fluidizing bed chamber surrounded by walls to form a tandem style reactor;
a diffusor means, at the bottom of said reactor and coupled to a pressurized gas source, for blowing gas above said diffusor means;
a partition wall means disposed in said fluidizing bed chamber adjacent to but spaced from said walls of said reactor or another partition wall means to form three recovery chambers, each said recovery chamber opening both at the top and the bottom for communicating with said fluidizing bed chamber;
said partition wall means including an inclined partition wall provided above said diffusor means for generating a circulating zone of a fluidizing bed in said fluidizing bed chamber;
auxiliary diffusor means for directing a pressurized gas into said recovery chambers; and
heat exchanging means disposed in said recovery chamber.

7. A thermal reactor as claimed in claim 6, wherein said auxiliary diffusor means is disposed horizontally and has perforations, the size of the area of said perforations increasing in a direction from a first end of said auxiliary diffusor means extending into said recovery chambers to a second end thereof.

8. A thermal reactor as claimed in claim 6, wherein said auxiliary diffusor is inclined with respect to the horizontal and has perforations, the size of the area of said perforations increasing in a direction from a first end of said auxiliary diffusor means extending into said recovery chambers to a second end thereof.

9. A thermal reactor comprising:
a fluidizing bed chamber surrounded by walls;
a fluidizing medium provided in said fluidizing bed chamber;
diffusor means, at the bottom of said reactor below said fluidizing medium and coupled to a pressurized gas source, for blowing gas upwardly into said fluidizing medium at different mass flows in different areas above the diffusor means and thereby for generating a circulating zone of a fluidizing bed in said fluidizing bed chamber;
inclined partition wall means, disposed at both sides of said fluidizing chamber adjacent to but spaced from said walls of said reactor, for forming recovery chambers at both said sides with openings both at the top and the bottom communicating with said fluidizing bed chamber;
auxiliary diffusor means for directing a pressurized gas into each said recovery chamber;
a discharge passage extending from each said side of said fluidizing bed chamber; and
a baffle provided at a lower part of each said recovery chamber above the respective said discharge passage.

* * * * *